United States Patent [19]

Yamamoto

[11] Patent Number: 4,529,282

[45] Date of Patent: Jul. 16, 1985

[54] MOTOR-DRIVEN FILM WINDER FOR CAMERAS

[75] Inventor: Masato Yamamoto, Kawagoe, Japan

[73] Assignee: Asahi Kogaku Kogyo Kabushiki Kaisha, Tokyo, Japan

[21] Appl. No.: 504,938

[22] Filed: Jun. 16, 1983

[30] Foreign Application Priority Data

Oct. 5, 1982 [JP] Japan .................................. 57-150972

[51] Int. Cl.³ .............................................. G03B 1/10
[52] U.S. Cl. .................................. 354/173.1; 354/293
[58] Field of Search ................... 354/81, 82, 170–172, 354/173.1, 173.11, 204, 212, 288, 293, 295

[56] References Cited

U.S. PATENT DOCUMENTS 2,769,380 11/1956 Rapaport ............................. 354/171
2,906,162 9/1959 Taylor ............................. 354/173.11

FOREIGN PATENT DOCUMENTS 1247840 12/1958 Fed. Rep. of Germany ...... 354/173
 596380  7/1959 Italy ................................... 354/173

Primary Examiner—William B. Perkey

[57] ABSTRACT

A motor-driven film winder for use with a camera having a manual film winder wheel, includes a cover selectively movable between a first position in which it prevents access to the manual film winder wheel and a second position in which the manual film winder wheel is exposed to permit manual film winding. In response to movement of the cover into its second position, the motor-driven film winder is disabled.

3 Claims, 4 Drawing Figures

MOTOR-DRIVEN FILM WINDER FOR CAMERAS

The present invention relates to a motor-driven film winder which is mountable on a camera body and selectively actuatable for either a manual film feed operation or an automatic film feed operation.

There are known in the prior art many motor-driven film winders which automatically advance the film in cameras. One form of automatic film transport mechanism is disclosed in Japanese Utility Model Application No. 57-58855 filed by the same applicant. According to the disclosed device, an independent motor-driven film winder is mounted on a camera body in meshing engagement with the manual film winder wheel of the camera. The motor-driven film winder then directly drives the manual film winder wheel. This motor-driven winder incorporates a serious disadvantage in that there is a danger that a finger may be caught by the portion of the film winder wheel which is left exposed for manual film feed operation.

For safe automatic film feed, it is therefore necessary to cover that portion of the film winder wheel that projects outwardly from the camera body. It is obviously preferable to attach a film winder wheel cover to the motor-driven film winder so that the film winder wheel may be manually operated when the motor-driven film winder is detached from the camera body. With such an arrangement, the film can be manually advanced by use of the film winder wheel when the motor-driven winder is dismounted from the camera, and when the motor-driven film winder is mounted on the camera the film can be fed automatically without risk of injury.

This arrangement, however, is not totally satisfactory, as manual winding is preferred when loading a roll of film so that the take-up spool of the camera can be freely adjusted. As a result, the motor-driven film winder must always be dismounted during film loading. In addition, motor-driven film winders often become inoperative during use of the camera and must therefore be removed before continuing use of the camera. Finally, inoperative motor-driven film winders are often employed as camera grips or handles. In this situation it is absolutely necessary to permit access to the winder wheel of the camera with the motor-driven film winder mounted thereto.

It is an object of the present invention to provide a motor-driven film winder which may be used without risk of injury.

Another object of the present invention is to provide a motor-driven film winder which permits access to the manual film winder without requiring its removal from the camera.

Still another object of the present invention is to provide a motor-driven film winder for cameras which has apparatus for selectively covering the manual film winder of the camera. More specifically, it is an object of the invention to provide such a motor-driven film winder for cameras having a manual film winder wheel.

A further object of the present invention is to provide a motor-driven film winder for cameras which includes a switch responsive to movement of a film winder wheel cover for disabling the motor-driven film winder.

According to the present invention, a motor-driven film winder for use with a camera having a manual film winder includes a cover selectively movable between a first position in which the cover prevents access to the manual film winder and a second position in which the cover is retracted to permit access to the manual film winder. In response to movement of the cover to the second position, the motor of the automatic film winder is disabled. The motor-driven film winder permits manual film winding even when mounted on the camera and therefore can be used as a camera grip.

Other and further objects of the invention will appear from the following description:

Figure 1:
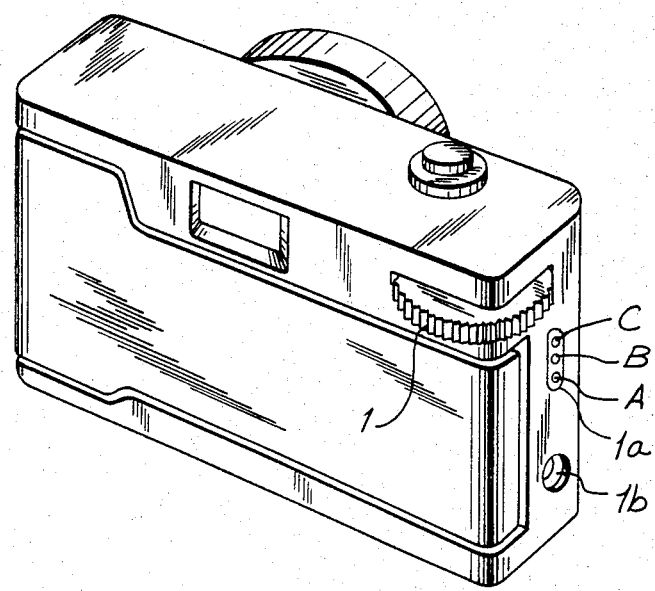
FIG. 1 is a perspective view of the camera having a manual film winder wheel.

Referring now to FIG. 1, the present invention is particularly useful when combined with a camera having a manual film winder in the form of wheel 1. Wheel 1 is manually rotatable about its axis and is formed with exposed peripheral teeth. The camera also has an electric connector plate 1a having contacts A, B and C, and a screw hole 1b located in the camera body for attachment of a motor-driven film winder.

Figure 2:
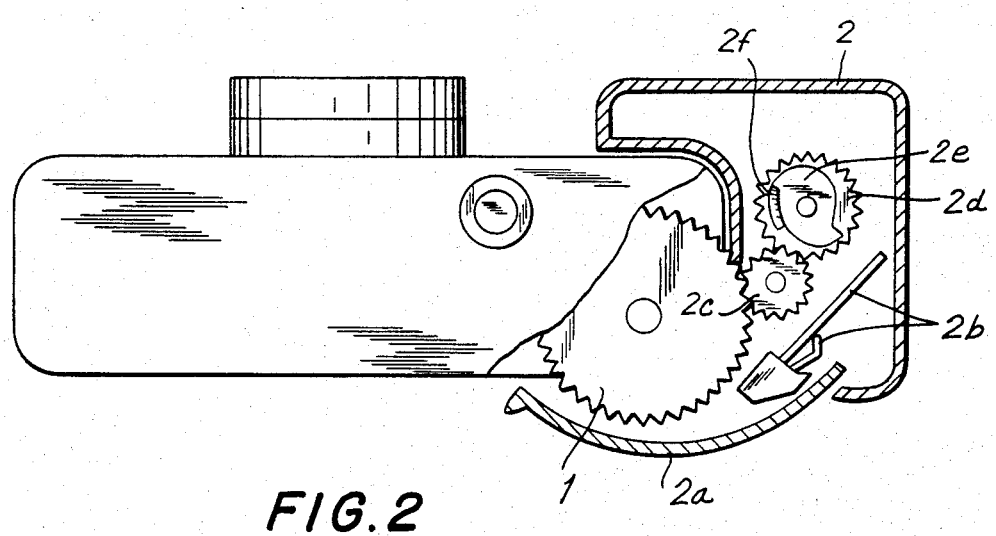
FIG. 2 is a fragmentary plan view, with parts shown in section, of the motor-driven film winder of the present invention mounted on the camera shown in FIG. 1.

FIG. 2 illustrates the motor-driven film winder 2 of the present invention mounted on the camera of FIG. 1, with the parts of the winder positioned for automatic motor-driven film feed operation. The motor-driven winder 2 includes a ratchet wheel 2e driven by a motor, indicated by the reference character 2g in FIG. 4, to engage a pawl 2f mounted on a gear 2d. Gear 2d is in driven engagement with an idler gear 2c which meshes with the teeth of the manual film winder wheel 1. Upon actuation of the motor 2g, ratchet wheel 2e is rotated and drives gear 2d through pawl 2f. Gear 2d drives idler gear 2c which in turn drives the manual film winder wheel 1 to advance the film. During motor-driven film feed operation the manual film feed wheel 1 is covered by a movable cover 2a which shields the wheel 1 from any physical contact with external objects such as an operator's finger. The motor-driven film winder 2 also has a switch 2b which connects the motor 2g to a power supply, indicated by the reference character 2h in FIG. 4, and is actuatable by the moveable cover 2a in a manner to be more fully described hereinbelow.

Figure 3:
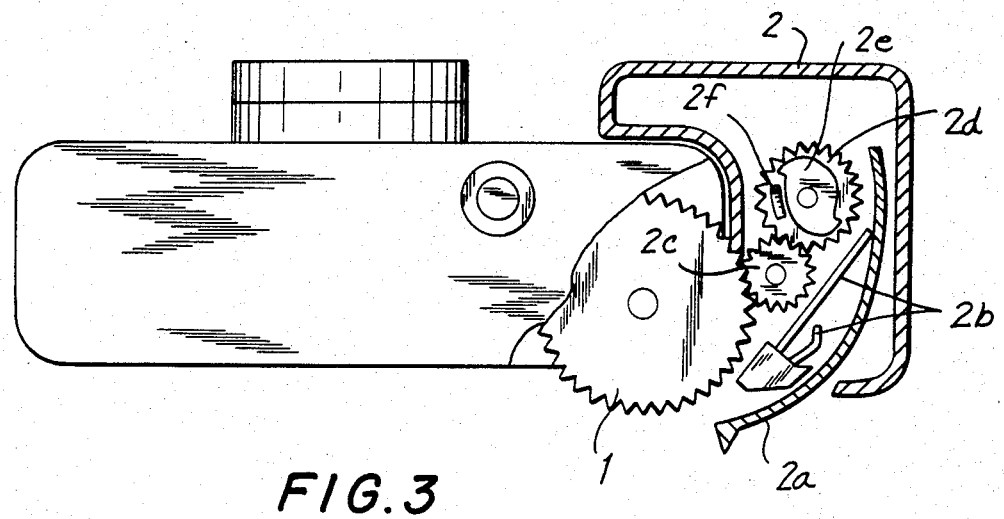
FIG. 3 is a fragmentary plan view, with parts shown in section, of the motor-driven film winder of the present invention mounted on the camera shown in FIG. 1 and permitting access to the winder wheel of the camera.

Referring now to FIG. 3 the motor-driven winder 2 is shown mounted on the camera of FIG. 1, with the parts of the winder positioned for manual film feed operation. During manual operation, the cover 2a is moved into the housing of the winder 2 to expose the manual film winder wheel 1. Retraction of the cover 2a separates the contacts making up switch 2b to open the normally closed switch. Opening switch 2b disconnects the motor 2g from the power supply 2h. As a result, the motor-driven film winder 2 is disabled and the manual film winder wheel 1 is rendered accessible to the operator for manually feeding the film in the camera. The use of the idler gears 2c and 2d together with the ratchet wheel 2e and pawl 2f, insures that no rotative power is transmitted from the manual film winder wheel 1 to the motor 2g during the manual film winding operation. Therefore, the manual film winder wheel 1 may be turned about its own axis with no more than the normal amount of force used when the motor-driven film winder 2 is disconnected from the camera.

Figure 4:
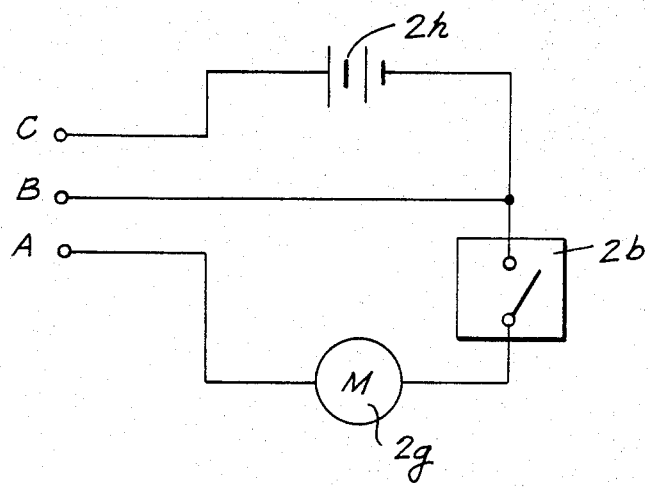
FIG. 4 is an electric circuit diagram of the motor-driven film winder.

Referring now specifically to FIG. 4, the circuit shown includes the motor 2g, the switch 2b and the power source 2h, which may be a battery. Terminals A, B and C are connected to corresponding terminals A, B and C on the connector plate 1a of the camera. Switch 2b will remain closed as long as the cover 2a is in the position shown in FIG. 2, in which it prevents access to the wheel 1. Upon movement of the cover 2a to the position shown in FIG. 3, in which it permits access to the wheel 1, the contacts of switch 2b are separated to open the switch.

As is known in the art, after a picture is taken, terminals A and C are coupled by circuit means internal to the camera to energize motor 2g. Motor 2g causes the film to advance to the next picture. After the film is advanced, terminal A is disconnected from terminal C and connected to terminal B to de-energize the motor until the next picture is taken. As long as cover 2a remains closed, switch 2b will remain closed, permitting energization of the motor 2g upon the connection of terminals A and C. Once the cover 2a is opened to permit access to the winder wheel 1, switch 2b is opened, preventing energization of motor 2g under any circumstances.

With the arrangement of the present invention, the camera may be used for manual or automatic film winding operations with the motor-driven film winder 2 mounted thereto. The manual film winding operation is selected in response to movement of cover 2a to the position shown in FIG. 3. In this position of the cover 2a, in which the wheel 1 is exposed, motor-driven operation of the wheel is prevented.

As will be readily apparent to those skilled in the art, the invention may be used in other specific forms or for other purposes without departing from its spirit or central characteristics. The present embodiments are therefore to be considered as illustrative and not restrictive, the scope of the invention being indicated by the claims rather than by the foregoing description, and all embodiments which come within the range of equivalence of the claims are intended to be embraced.

What I claim is:

1. A motor-driven film winder for use with a camera having a manual film winder wheel, which permits both manual and motor-driven operation of said manual film winder wheel, comprising a housing adapted to be secured to the portion of said camera having said manual film winder wheel, a motor located within said housing, a gear train located within said housing and adapted to couple said motor to said manual film winder wheel such that said motor drives said manual film winder wheel when activated but does not impede manual operation of said manual film winder wheel when deactivated, a power supply for supplying electric power to activate said motor, a cover connected to said housing and movable into a first position in which it covers and prevents access to said manual film winder wheel and a second position in which the cover is retracted to expose and permit manual operation of said manual film winder wheel, and switch means responsive to movement of said movable cover into said second position for electrically disconnecting said motor from said power supply to prevent activation of said motor.

2. The motor-driven film winder of claim 1 in which said gear train comprises a ratchet wheel adapted to be driven by said motor when said motor is activated, a first gear, a pawl mounted on said first gear such that said pawl is in driving engagement with said ratchet wheel only when said ratchet wheel is driven by said motor, a second gear driveable by said first gear and held in driving engagement with said manual film winder wheel, whereby upon activation of said motor said ratchet wheel drives said first gear through said pawl, said first gear drives said second gear which in turn drives said manual film winder wheel, and whereby said motor does not impede manual operation of said manual film winder wheel when said motor is deactivated since said pawl is not in driving engagement with said ratchet wheel when said motor is deactivated.

3. The motor-driven film winder of claim 1 in which said housing is capable of functioning as a camera grip.

* * * * *